US007630972B2

(12) United States Patent
Ott, IV et al.

(10) Patent No.: US 7,630,972 B2
(45) Date of Patent: Dec. 8, 2009

(54) CLUSTERED SEARCH PROCESSING

(75) Inventors: Edward Stanley Ott, IV, Palo Alto, CA (US); Keith David Saft, San Francisco, CA (US); Marco Boerries, Los Altos Hills, CA (US); Meher Tendjoukian, Burlingame, CA (US); Paul Yiu, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 271 days.

(21) Appl. No.: 11/651,102

(22) Filed: Jan. 5, 2007

(65) Prior Publication Data

US 2008/0168052 A1 Jul. 10, 2008

(51) Int. Cl.
*G06F 17/30* (2006.01)
(52) U.S. Cl. ............................................. 707/3; 707/10
(58) Field of Classification Search ........................ None
See application file for complete search history.

(56) References Cited

U.S. PATENT DOCUMENTS

| | | | |
|---|---|---|---|
| 6,460,036 B1 | 10/2002 | Herz | |
| 6,718,336 B1* | 4/2004 | Saffer et al. ................. | 707/102 |
| 6,922,699 B2 | 7/2005 | Schuetze et al. | |
| 7,082,426 B2 | 7/2006 | Musgrove et al. | |
| 7,107,524 B2* | 9/2006 | Lin et al. .................... | 715/234 |
| 2002/0013729 A1 | 1/2002 | Kida | |
| 2003/0018521 A1 | 1/2003 | Kraft et al. | |
| 2004/0068514 A1* | 4/2004 | Chundi et al. ............... | 707/102 |
| 2004/0254916 A1* | 12/2004 | Dettinger et al. ............ | 707/3 |
| 2007/0022093 A1* | 1/2007 | Wyatt et al. ................. | 707/2 |
| 2007/0226198 A1* | 9/2007 | Kapur ......................... | 707/3 |
| 2008/0154859 A1* | 6/2008 | Chi et al. .................... | 707/3 |

OTHER PUBLICATIONS

Dudley, Brier: "What has the iPod looking over its shoulder . . . and other tech predictions for the new year," *The Seattle Times*, pp. 1-4, Jan. 1, 2007.
"Vivisimo Velocity Clustering Engine," Vivisimo, Inc., http://vivisimo.com/html/clustering, 6 pages.
International Search Report and Written Opinion mailed Jun. 25, 2008, which issued during the prosecution of International Patent Application No. PCT/US2007/086990.

\* cited by examiner

*Primary Examiner*—Uyen T. Le
(74) *Attorney, Agent, or Firm*—Darby & Darby P.C.; Jamie L. Wiegand

(57) ABSTRACT

Methods and apparatus for searching data and grouping search results into clusters that are ordered according to search relevance. Each cluster includes one or more data type, such as images, web pages, local information, news, advertisements, and the like. In one embodiment, a search term is evaluated for related concepts indicating categories of data sources to search. Data sources may also be identified by context information such as a location of a client device, a currently running application, and the like. Search results in each cluster are ordered by relevance and each cluster is given a score based on an aggregate of the relevance within the cluster. Each cluster score may be modified based on one or more corresponding concepts and/or context information. The clusters are ordered based on the modified scores. Content, including advertisements, may also be added to the ordered list to appear as another cluster.

16 Claims, 8 Drawing Sheets

CLUSTERED SEARCH PROCESSING

FIELD OF ART

The present invention relates generally to searching data and, more particularly, but not exclusively to grouping search results into clusters that are ordered according to search relevance.

BACKGROUND

Tremendous changes have been occurring in the Internet that influence our everyday lives. For example, in today's society, mobile computing devices are becoming increasingly more common. Many mobile computing devices, such as personal digital assistants, cellular phones, and the like, may be employed to communicate voice messages, emails, text messages, and so forth, as well as to search for information over the Internet. It is not uncommon to see a person on a bus, train, or even a boat, to be using their mobile devices to search for merchants, restaurants, music, businesses, or the like.

However, performing a search query for user relevant information still remains cumbrous. Often, the user might have to perform several search queries to obtain relevant search results. Irrelevant search results mean that the user is less likely to find when they are looking for, which in turn may translate into lost opportunities for merchants, or other businesses, to prosper from the user. Therefore, many businesses are searching for new ways to make search results more relevant to the user. One technique is to group search results that match submitted search terms. Some search systems provide predefined groups of data types for search results, such as web pages, images, videos, local results, shopping related results, jobs, news, advertisements, and the like. The groups are typically arranged in the same order and each group typically includes only one data type.

Another technique is to determine groups based on textual similarity of the search results. However, textually similar groups generally do not take into account any information about the searcher. Consequently, the groups that are determined by textual similarity may not be the most relevant groups to the searcher. Similarly, a ranking of textually similar groups may not be in an order that is most relevant to the searcher. Current grouping systems also generally provide only brief summary information and links to the search results. A returned search results page generally does not include any substantive content without links based on the search terms. Thus, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Illustrative Operating Environment

Figure 1:
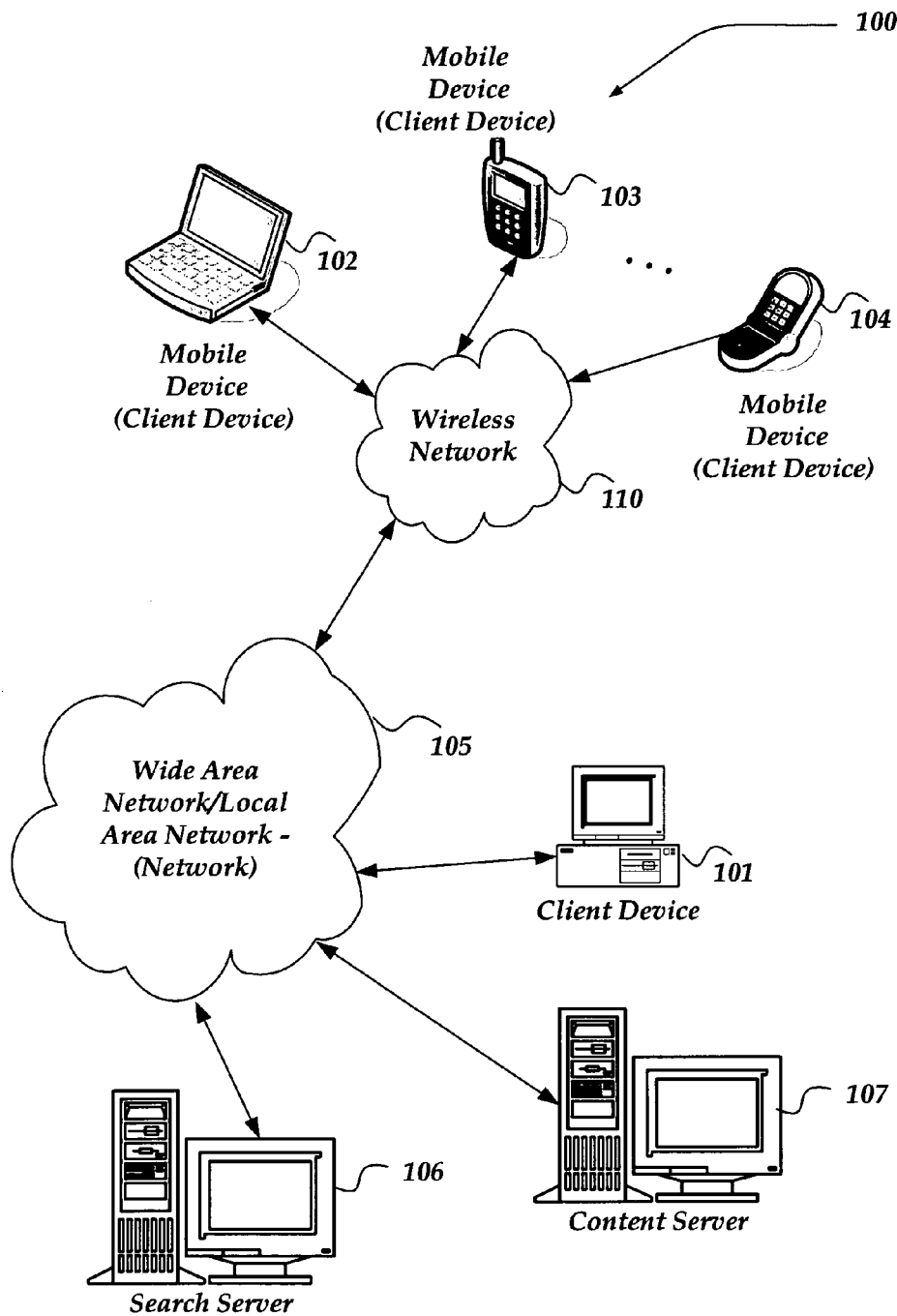
FIG. 1 is a system diagram of one embodiment of an environment in which the invention may be practiced.

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes networks that enable communication between client and server devices. A network 105 may comprise one or more local area networks ("LANs") and/or wide area networks ("WANs"). A wireless network 110 may comprise LANs, WANs, telephony networks, or the like. System 100 also includes a general purpose client device 101, mobile client devices 102-104, a search server 106, and content server 107.

One embodiment of mobile devices 102-103 is described in more detail below in conjunction with FIG. 2. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and several lines of color LCD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. In one embodiment, a user of the mobile device may employ the browser application to perform a search over a network. However, another application may also be used to perform a search over the network.

Mobile devices 102-104 also may include at least one other client application that is configured to receive content from another computing device. The client application may include a capability to provide and receive textual content, graphical content, audio content, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier. The information may also indicate a content format that the mobile device is enabled to employ. Such information may be provided in a message, or the like, sent to search server 106, client device 101, or other computing devices.

In one embodiment, mobile devices 102-104 may also provide a physical location to another computing device. In one embodiment, however, mobile devices 102-104 may provide the physical location information in terms of a latitude and longitude, or the like. However, mobile devices 102-104 may also provide other information that may be employed to determine a physical location of the device, including for example, a cell tower address, a MAC address, IP address, or the like.

Mobile devices 102-104 may further be configured to include a client application that enables the end-user to log into an end-user account that may be managed by another computing device, such as search server 106. Such end-user account, for example, may be configured to enable the end-user to receive emails, send/receive IM messages, SMS messages, access selected web pages, participate in a social networking activity, perform search queries, or the like. However, performing search queries, participation in various social networking activities, or the like, may also be performed without logging into the end-user account.

Client device 101 may include virtually any computing device capable of communicating over a network to send and receive information, including search query information, location information, social networking information, or the like. The set of such devices may include devices that typically connect using a wired or wireless communications medium such as personal computers, multiprocessor systems, microprocessor-based or programmable consumer electronics, network PCs, or the like.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include cellular networks, mesh networks, Wireless LAN (WLAN) networks, and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G) generation radio access for cellular systems, WLAN, Wireless Router (WR) mesh, and the like. Access technologies such as 2G, 3G, and future access networks may enable wide area coverage for mobile devices, such as mobile devices 102-104 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, wireless network 110 may include virtually any wireless communication mechanism by which information may travel between mobile devices 102-104 and another computing device, network, and the like.

Network 105 is configured to couple search server 106 and its components with other computing devices, including, mobile devices 102-104, client device 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between search server 106, client device 101, and other computing devices.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

One embodiment of search server 106 is described in more detail below in conjunction with FIG. 3. Briefly, however, search server 106 may include any computing device capable of connecting to network 105 to enable data searching, filtering, sorting, and other data management operations. Search server 106 may also provide network portal information and/or services, including providing content and tracking users online behavior with their permission. Search server 106 may further enable aggregation and management of social networking information. Devices that may operate as search server 106 include personal computers desktop computers, multiprocessor systems, microprocessor-based or programmable consumer electronics, network PCs, servers, and the like.

Although FIG. 1 illustrates search server 106 as a single computing device, the invention is not so limited. For example, one or more functions of search server 106 may be distributed across one or more distinct computing devices. For example, managing searches, search results, Instant Messaging (IM) sessions, SMS messages, email messages, sharing of contact information, collecting behavior information, aggregating and/or storing of social networking information, or the like, may be performed by a plurality of computing devices, without departing from the scope or spirit of the present invention.

Content server 107 represents a variety of content and/or other data that may useable on mobile devices 102-104 and/or on client 101. Such content may include web content, audio content, video content, FTP data, or the like. Data services may include, but are not limited to web services, third-party services, audio services, video services, email services, IM services, SMS services, VOIP services, calendaring services, photo services, or the like. Moreover, information about the content and/or services provided by content server 107 may be employed to provide results to a search query.

Devices that may operate as content server 107 include personal computers desktop computers, multiprocessor systems, microprocessor-based or programmable consumer electronics, network PCs, servers, and the like.

Illustrative Mobile Client Environment

Figure 2:
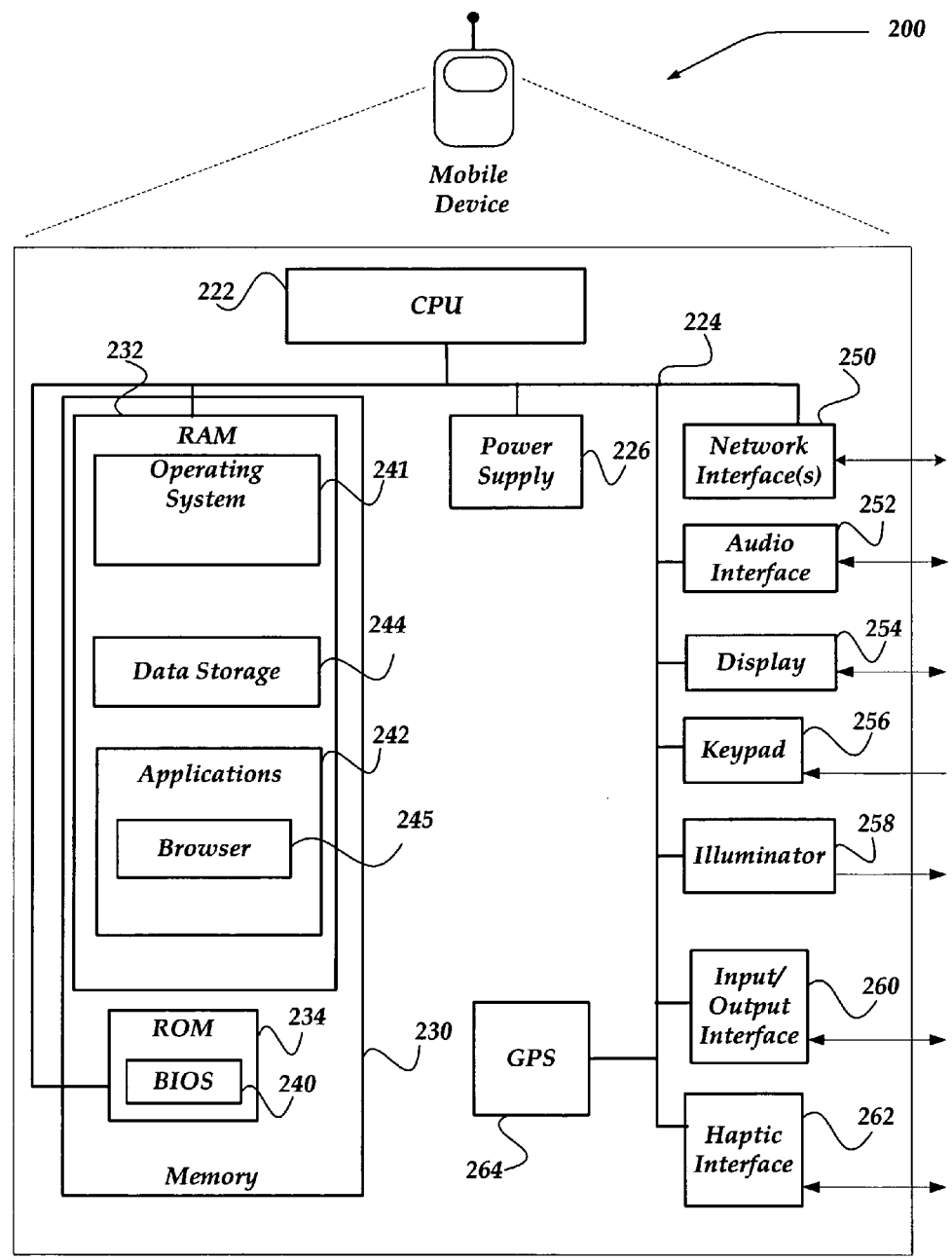
FIG. 2 shows one embodiment of a mobile device that may be included in a system implementing the invention.

FIG. 2 shows one embodiment of mobile device 200 that may be included in a system implementing the invention. Mobile device 200 may include many more or less components than those shown in FIG. 2. However, the components shown are sufficient to disclose an illustrative embodiment for practicing the present invention. Mobile device 200 may represent, for example, one embodiment of at least one of mobile devices 102-104 of FIG. 1.

As shown in the figure, mobile device 200 includes a central processing unit (CPU) 222 in communication with a mass memory 230 via a bus 224. Mobile device 200 also includes a power supply 226, one or more network interfaces 250, an audio interface 252, a display 254, a keypad 256, an illuminator 258, an input/output interface 260, a haptic interface 262, and an optional global positioning systems (GPS) receiver 264. Power supply 226 provides power to mobile device 200. A rechargeable or non-rechargeable battery may be used to provide power. The power may also be provided by an external power source, such as an AC adapter or a powered docking cradle that supplements and/or recharges a battery.

Mobile device 200 may optionally communicate with a base station (not shown), or directly with another computing device. Network interface 250 includes circuitry for coupling mobile device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions. In another embodiment, illuminator 258 may comprise a flash for a built-in camera (not shown).

Mobile device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate mobile device 200 in a particular way when another user of a computing device is calling.

Optional GPS transceiver 264 can determine the physical coordinates of mobile device 200 on the surface of the Earth, which typically outputs a location as latitude and longitude values. GPS transceiver 264 can also employ other geo-positioning mechanisms, including, but not limited to, triangulation, assisted GPS (AGPS), Enhanced Observed Time Difference (E-OTD), cell identifier (CI), service area identifier (SAI), enhanced timing advance (ETA), base station subsystem (BSS) or the like, to further determine the physical location of mobile device 200 on the surface of the Earth. It is understood that under different conditions, GPS transceiver 264 can determine a physical location within millimeters for mobile device 200; and in other cases, the determined physical location may be less precise, such as within a meter or significantly greater distances. In one embodiment, however, the mobile device may through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of mobile device 200. The mass memory also stores an operating system 241 for controlling the operation of mobile device 200. It will be appreciated that this component may include a specialized client communication operating system such as Windows Mobile™, or the Symbian® operating system, or a general purpose operating system such as a version of UNIX, or LINUX™. The operating system may include, or interface with a Java virtual machine module that enables control of hardware components and/or operating system operations via Java application programs.

Memory 230 further includes one or more data storage 244, which can be utilized by mobile device 200 to store, among other things, applications 242 and/or other data. For example, data storage 244 may also be employed to store information that describes various capabilities of mobile device 200. The information may then be provided to another device based on any of a variety of events, including being sent as part of a header during a communication, sent upon request, or the like. Moreover, data storage 244 may also be employed to store search data, user preferences, address books, buddy lists, aliases, social networking information, or the like. At least a portion of the information may also be stored on a disk drive or other storage medium (not shown) within mobile device 200.

Applications 242 may include computer executable instructions which, when executed by mobile device 200, transmit, receive, and/or otherwise process messages (e.g., SMS, MMS, IM, email, and/or other messages), audio, video, and enable telecommunication with another user of another client device. Other examples of application programs include calendars, search programs, email clients, IM applications, SMS applications, VOIP applications, contact managers, task managers, transcoders, database programs, word processing programs, security applications, spreadsheet programs, games, search programs, and so forth. One application shown in the figure is browser 245.

Browser 245 may include virtually any application configured to receive and display graphics, text, multimedia, and the like, employing virtually any web based language. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. However, any of a variety of other web based languages may be employed.

In one embodiment, browser 245 may be configured to enable access to a search application, such as might be available through search server 106 and/or content server 107 of FIG. 1. In one embodiment, a user of mobile device 200 may input to the search application a variety of search terms for use in obtaining a search results. Mobile device 200 may also provide location information, or information useable in determining its physical location. Such information, may, in one embodiment, be useable to automatically (e.g., transparent to a user input) modify the search query.

Illustrative Server Environment

Figure 3:
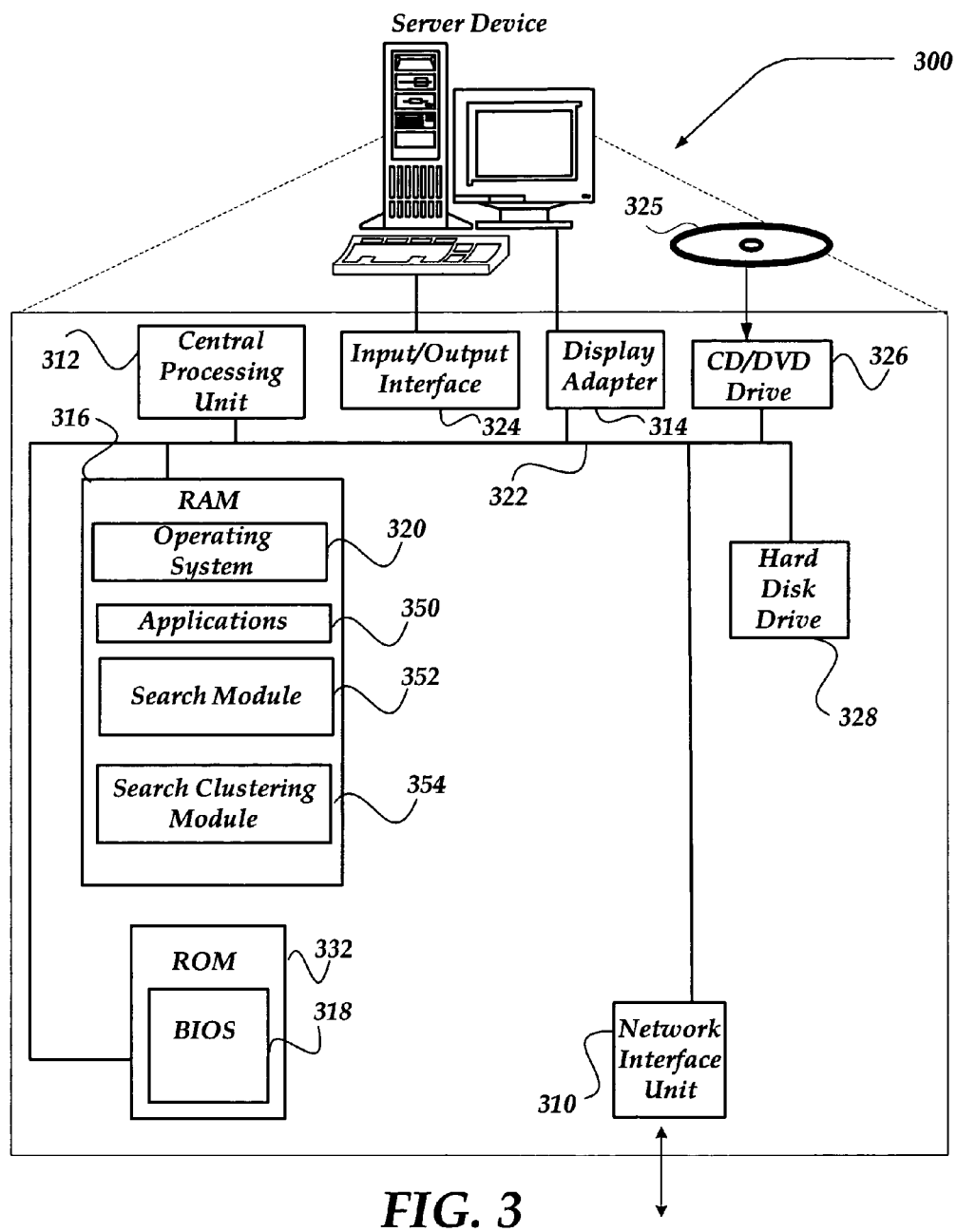
FIG. 3 shows one embodiment of a server device that may be included in a system implementing the invention.

FIG. 3 shows one embodiment of a server device, according to one embodiment of the invention. Server device 300 may include many more components than those shown. The components shown, however, are sufficient to disclose an illustrative embodiment for practicing the invention. Server device 300 may represent, for example, search server 106 and/or content server 107 of FIG. 1.

Server device 300 includes a central processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of server device 300. Any general-purpose operating system may be employed. Basic input/output system ("BIOS") 318 is also provided for controlling the low-level operation of server device 300. As illustrated in FIG. 3, server device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 350 are loaded into mass memory and run on operating system 320. Examples of application programs may include transcoders, schedulers, calendars, database programs, word processing programs, HTTP programs, customizable user interface programs, IPSec applications, encryption programs, security programs, VPN programs, SMS message servers, IM message servers, email servers, account management and so forth. A search module 352 and/or a search clustering module 354 may also be included as an application program within applications 350 or as a separate application.

Search module 352 is configured to receive search terms from client devices, determine other search parameters, perform searches of data sources, provide search results, and perform other search related operations. Search clustering module 354 may be part of, or separate from search module 352. Search clustering module 354 is configured to organize search results into groups and rank the groups of results. Search module 352 and/or search clustering module 354 may employ a process substantially similar to that described below.

Generalized Operation

Figure 4:
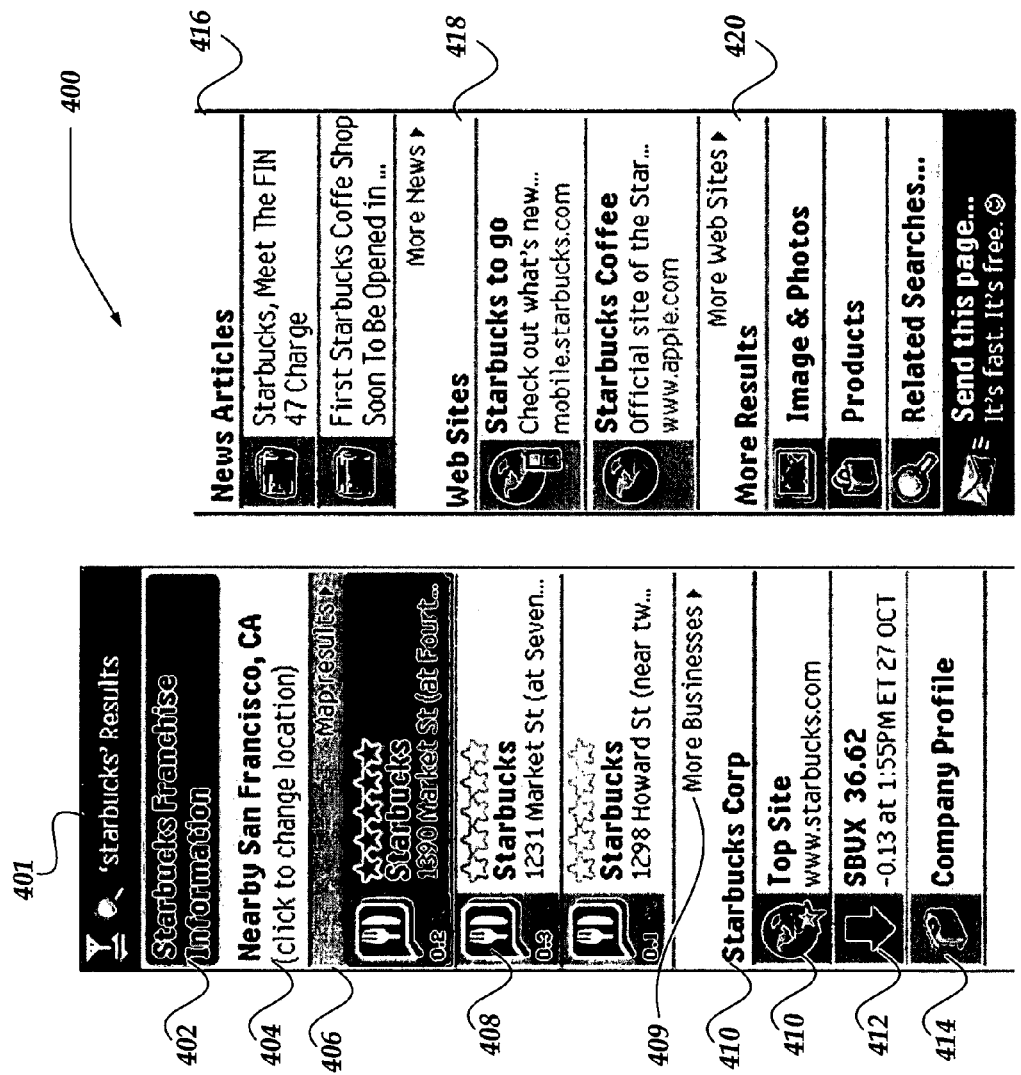
FIG. 4 shows one example of a search results page for a topical search term that is related to relatively intuitive concepts to determine search results.

The operation of certain aspects of the invention will now be described with respect to FIGS. 4-8. FIG. 4 is an illustration of a search results display 400 on a mobile device. The entire search results may be scrolled through a display of limited area. In addition to search results, content can be displayed among the search results. Content may include information related to a submitted search term 401, such as content 402. Alternatively, or in addition, content may include location information 404, an advertisement, or other information. Generally, content information is formatted to appear similar to search results, although content may be formatted in any other way.

A first cluster element 406 indicates a first cluster of search results. The cluster element may be selected to toggle between an expanded view of search results and a closed view of only the cluster element. The cluster element may also comprise a search result itself. The first cluster of search results is displayed near the top of results display 400. The first cluster generally includes search results that are most relevant to the submitted search term. A cluster includes search results of one or more particular data types, such as local listing information, news articles, web page links, images, shopping information, other suggested searches, and the like. For example, first cluster element 406 indicates a cluster of local listing information for coffee stores identified by the search term and within a predefined radius of a mobile device location. In this example, local listing information was determined to be the most relevant cluster of information based on a number of factors, such as the search term, information determined from aggregate analysis of click streams (selections made by numerous users) after entering the search term, prior behaviors of the user in during the search term, location of the mobile device, and/or other information. This particular search term 401 is associated with the concept of retail stores and with the concept of a company. However, the concept of retail stores is likely to have a higher relevance to more users than the concept of a company. Thus, the cluster of local listing information is ranked as the first cluster.

The search results of a cluster can also include content indicating a data type or other information. For instance, a symbol 408 can indicate a type of information provided in the search result. In addition, or alternatively, a logo or other content may be placed on one or more search results, such as based on a paid placement. A selectable expansion control element 409 can be used to display additional results in a cluster.

A second ranked cluster is displayed after the first ranked cluster. In this example, a second rank cluster element 410 identifies a cluster that includes multiple data types of search results. This sample cluster includes a web site search result 410, a stock quote search result 412, and a link to specialized company profile information 414. This cluster illustrates a cluster type that is defined to include multiple specific data types. Alternatively, a cluster type can be generated with multiple data types that may be determined based on search criteria and/or other information. As shown by the second ranked cluster, customized cluster types can be defined to include multiple data types of search results and/or content.

Other cluster types may include a single data type of search results, such as the first rank cluster, third-ranked cluster 412, and fourth ranked 414. In those cases, the cluster type may be equivalent to the date type. Lower rank clusters may also be displayed with fewer search results, or with only space a cluster selection element. For example, low ranked clusters 416 are displayed with only cluster selection elements that require the user to select a cluster selection element to expand the view of corresponding search results. Thus, the relevance of clusters can be indicated by location, size, and other attributes.

Figure 5:
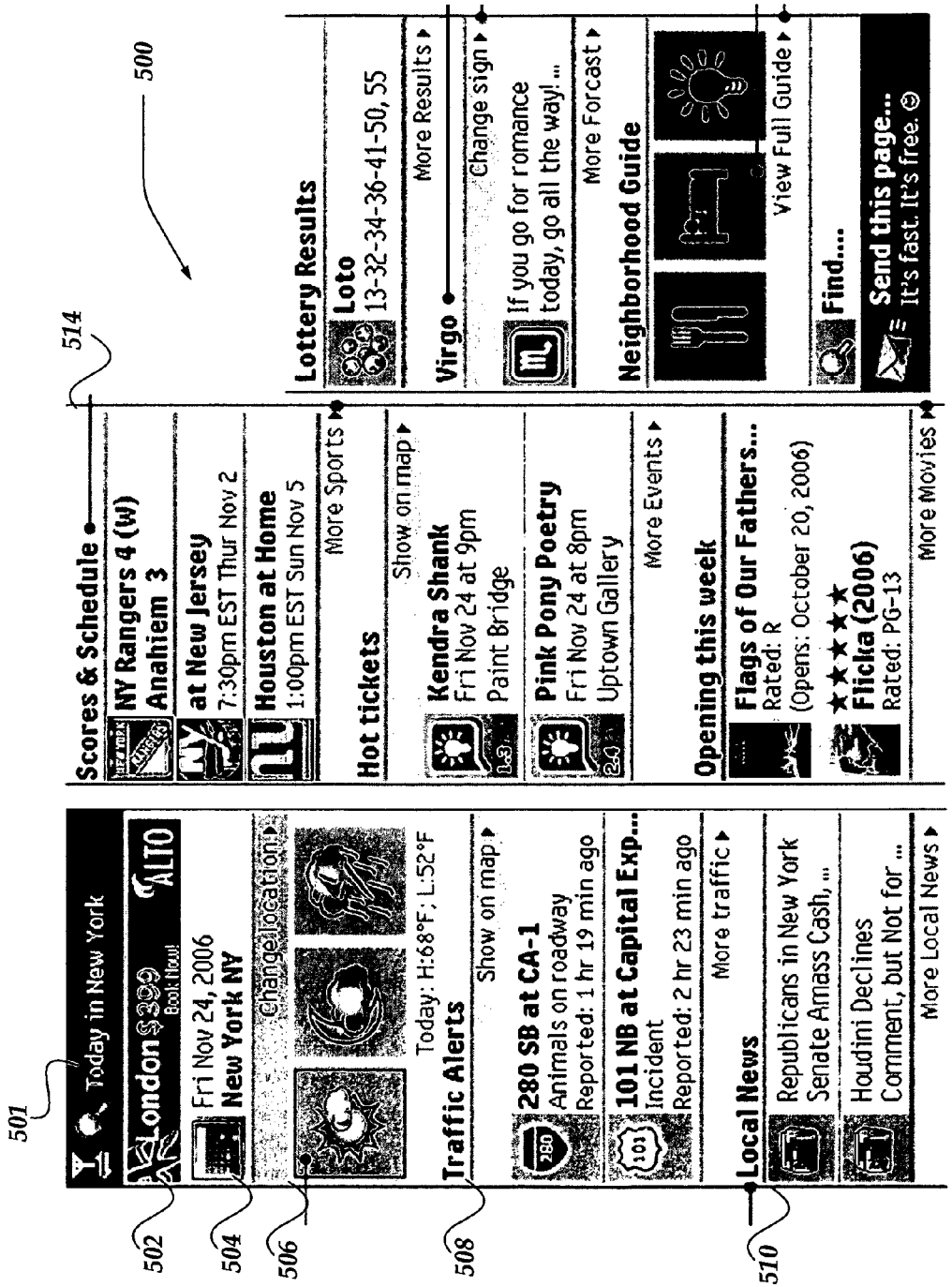
FIG. 5 shows one example of a search results page for a search term that is related to less intuitive concepts to determine search results.

The search term used in FIG. 4 is generally a topical search term that is related to relatively intuitive concepts. Some search terms are not so intuitive. FIG. 5 shows one example of a search results page 500 for a search term 501 that is less intuitively related to concepts for which a user would likely want search results. The search term "today," by itself, may not immediately suggest certain data types of search results that a user probably desires. This search term may indicate a concept of a newspaper title, a morning television show, or other unrelated concept. In this case, contextual information, such as the location of the mobile device, may provide a better indication of the user's intent. Thus, context information may be given more weight to determine which data sources to search and how to rank clusters of search results. If the mobile device is in New York City, and the user enters the search term "today," the user is likely to be searching for information relevant to daily life in the city.

Such information may include content related to this city on the current day. For example, date content 504 may provide the current date and enable the user to access a calendar. Similarly, whether or information 506 may display current and forecasts weather conditions in the city. One or more advertisements 502 may also be included. Each of these content items may be obtained from a specialized data source or from an individual data source in the same manner that clusters of search results are obtained. This content cluster, or each content item, can also be ranked relative to other clusters as if the content cluster or content item were just another cluster among the plurality of clusters of search results. In this case, the content information may be considered the first ranked cluster. A traffic alerts cluster 508 would be considered the second ranked cluster. Similarly, local news cluster 510 would be the third ranked cluster, sports cluster 514 would be the fourth ranked cluster, and so on. The clusters of search results may not have data types that are intuitively associated with the search term, but contextual data can be used to obtain and rank clusters of relevant search results.

Figure 6:
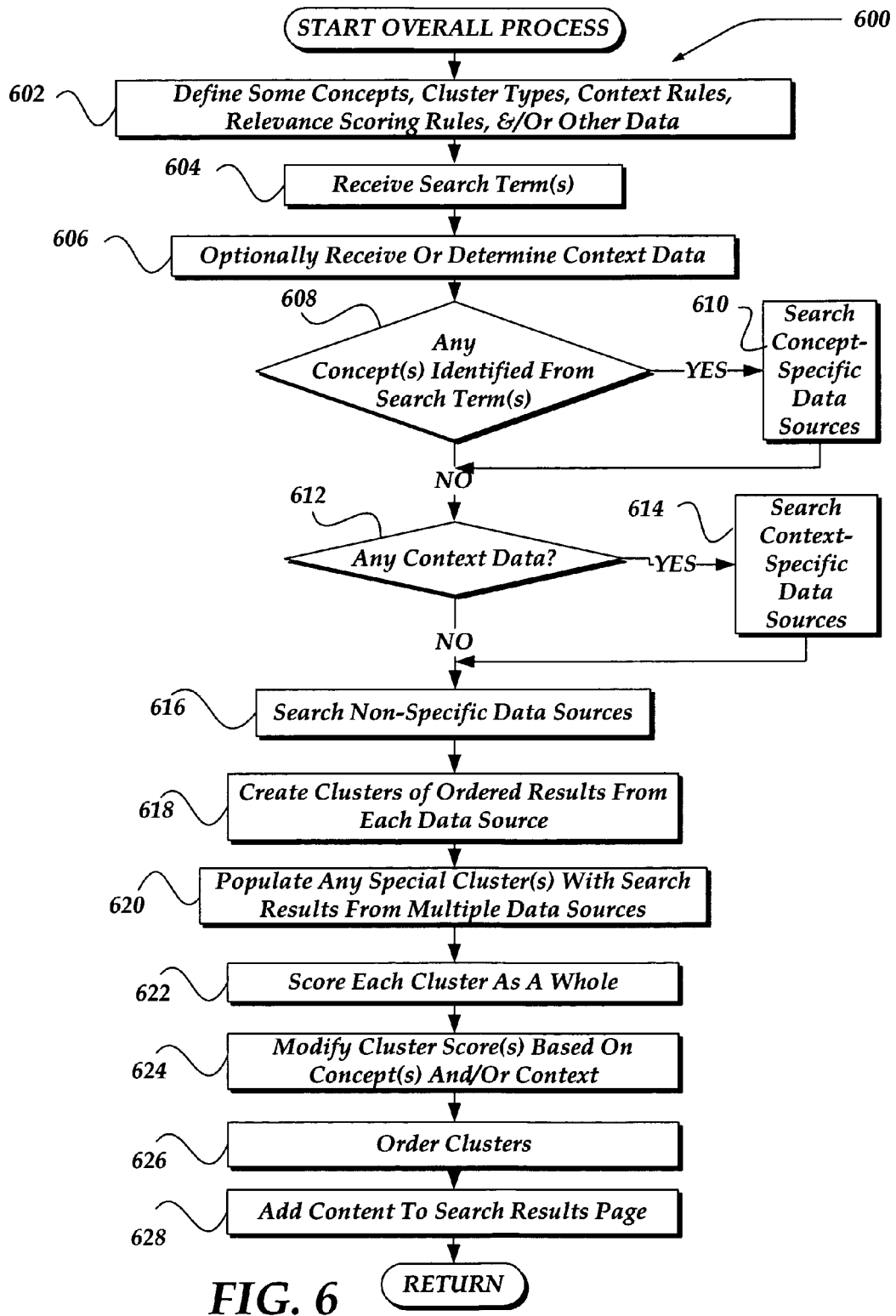
FIG. 6 illustrates a logical flow diagram generally showing one embodiment of an overall process for searching data.

FIG. 6 illustrates a logical flow diagram generally showing one embodiment of an overall process 600 for searching data and ranking clusters of search results and/or content. The process may be performed by a server, a combination of servers, a standalone computing device, and/or other configurations of software modules and/or computing devices. To simplify the discussion, the following embodiment is described in terms of a single server in communication with a single mobile client device. At an operation 602, a human administrator may predefined certain concepts, cluster types, data types, concept processing rules, context rules, relevance scoring rules, and/or other information that may be used to determine data sources, rank search results, rank clusters of search results, add content, determine user preferences, determine user behaviors, and/or perform other operations. Alternatively, or in addition, automated analyses can be performed to determine one or more of the above information types, operational rules, and/or other data. For example, clicked stream analysis can be performed on aggregated data to determine multipliers and/or other factors that may be used in determining the resources and/or ranking information. In another embodiment, no such preprocessing is performed.

At an operation 604, the server receives one or more search terms from the mobile device. To simplify the discussion, a single search term will be assumed. Iterative processing and/or other logic can be used in alternate embodiments. The server may also receive, or obtain, context data at an operation 606. For example, the server may check a user's current location, the current application running on the mobile device, the mobile device profile data, online profile data for preferences, behaviors, past purchases, social networking relationships, and/or other user-specific data. Similarly, the server may obtain or calculate aggregated data from click stream analyses and/or other statistical analyses. The contextual information can be used to adjust default weighting multipliers prior to and/or during search processing. In another embodiment, no contextual data is received or determined. Some additional examples of contexts may include, but are not limited to:

- web page or screen of the client device used to submit the search term
- tracked behavior of a user (e.g. purchase history, number of searches)
- user-specific data (e.g. demographic data such as gender)
- time of day at the time of query
- time zone of the user
- search query characteristics (e.g. language, length of query, media type)
- data plan of the device or user
- device capabilities or characteristics (e.g. screen size)
- user expressed preferences (e.g. don't render images)
- proximity (e.g. to other devices or other users)
- direction of the device (e.g. device is facing north)
- movement of the device (e.g. device is going north, device is moving at 10 mph)
- tracked behavior or other context of users related to user initiating search;
- social network (e.g. user A's friends search for sports, so sports are more relevant for user A)
- network characteristics (e.g. speed)
- content owned by the user or on a device used by the user, which can be, but does not have to be the same as the mobile device (e.g. user has a document on their PC relevant to a search done on the mobile device)

At a decision operation 608, the server determines whether any known concepts are identified from the submitted search term. The server may perform a lookup operation for concepts associated with the search term, or may perform other interpretations, such as natural language processing, to determine concepts. Concepts generally identify categories of information related to the search term. For example, the search term "Chicago" is related to the concept of a city and the concept of a play. As another example, the search term "Chicago pizza" is related to the concept of a style of pizza and the concept of food in the city of Chicago.

Each concept may be associated with one or more particular data sources. For instance, play or movie schedules for local theaters may be in specific data sources that would not normally be searched unless it is determined that the user intends the search term to be associated with a play or movie. Other examples of concept-specific data sources may include, but are not limited to:

| | | |
|---|---|---|
| web | stock quote data | part inventory data |
| wap | dates/personals | photos |
| image | dictionary | plane schedules |
| photos | email | podcasts |
| video | entertainment | printed materials |
| local listings | encyclopedia | products |
| news | events | ringtones |
| weather | ferry schedules | RSS |
| multimedia | finance | screensavers |
| address books | flight status | shopping |
| astrology | games | sports |
| audio | inventory | thesaurus |
| books | job | time |
| bus schedules | landmarks | timezones |
| celebrities | lottery | train schedules |
| cities | movie show times | translations |
| classifieds | movie theaters | traffic |
| consumables | movies | TV showtimes |
| countries | music | wallpapers |
| currency | people | venues |

Each concept-specific data source may include a single data type of data, such as all stock quote data. Alternatively, a concept-specific data source may actually comprise multiple data sources with the same or differing data types. If the server identifies any concepts from the search term, the server searches corresponding concept-specific data sources at an operation 610. More details on one embodiment of the concept-specific search process are provided below with regard to the description of FIG. 7. The search results from each concept-specific data source comprises a cluster of search results. The cluster type of a cluster may be the same as the data type or a custom cluster type of multiple data types.

After searching concept-specific data sources, or if no concepts were identified, the server determines whether any context data was submitted or is available, at a decision operation 612. If context data is available, the server looks up or determines associations between the context data and context-specific data sources. The server searches the associated context-specific data sources at an operation 614. The search results from each context-specific data source comprises another cluster of search results. As above, a context-specific data source may include a single data type of data, such as all restaurant listings within a certain radius of the mobile device's current location. Alternatively, a context-specific data source may comprise multiple data sources with the same or differing data types. Accordingly, the cluster type of a cluster may be the same as the data type or a custom cluster type of multiple data types.

After searching context-specific data sources, or if no context data was available, the server search is nonspecific data sources at an operation 616. Nonspecific data sources may comprise data that will always be searched, such as web page indices, news data, images, shopping data, and the like. At an operation 618, the server orders the results in each cluster of search results obtained from each data source. The search results within a cluster are generally rank based on relevance of the search results to the search term. A number of techniques may be used to rank the search results within a cluster. Weighting factors, rules, and/or other processing may utilize aggregate click stream data, users specific click stream data, user behavior information, and/or other information. In some cases, special clusters are populated with search results from multiple data sources and rank, at an operation 620.

At an operation 622, the server determines a score for each cluster as a whole. The server may determine a cluster score with relevance scores of the search results within the cluster.

For example, the server may determine a weighted average based on a cumulative score of the relevance scores and based on a predefined, or dynamically determined, factor. Each cluster score may be modified an operation 624, based on concepts and or context data. Further detail regarding this operation is described below with regard to FIG. 8. All of the clusters are then arranged in an order at an operation 626, based on the cluster scores.

In this example embodiment, a search results web page is generated with the ordered clusters, such as those web pages illustrated in FIGS. 4 and 5. Additional content, such as non-cluster advertising, logos, and/or other content may be added to the search results web page at an operation 628. The search results web page is then returned to the mobile device for display.

Figure 7:
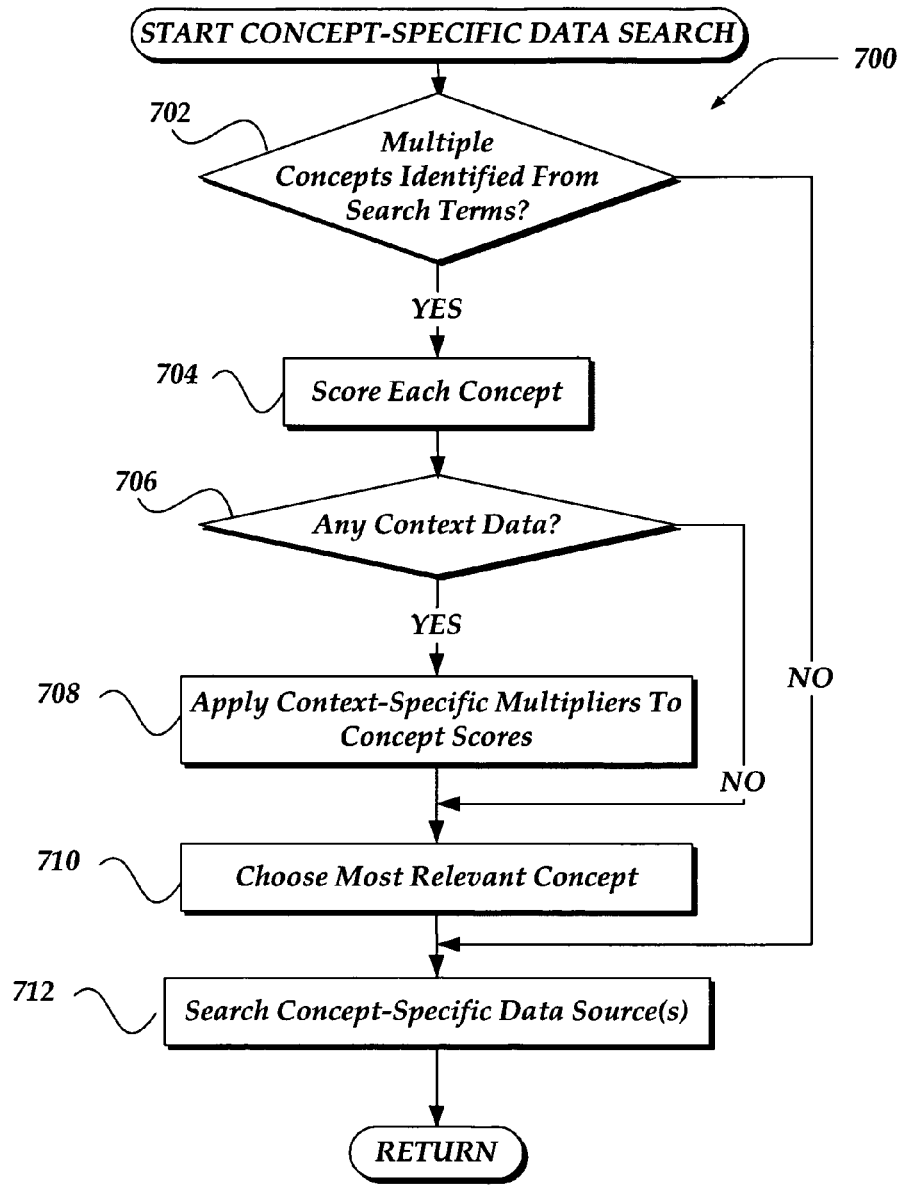
FIG. 7 illustrates a logical flow diagram generally showing one embodiment of a process for determining concept-specific data sources.

Further detail is now provided regarding operation 610. FIG. 7 illustrates a logical flow diagram generally showing one embodiment of a process 700 for determining and searching concept-specific data sources. At a decision operation 702, the server determines whether or multiple concepts were identified from the search term. If only a single concept was identified, the server searches the corresponding concept-specific data source at an operation 712. If multiple concepts were identified, the server determines a score for each concept at an operation 704. As with the cluster score, a concept score can be determined based on relevance of the concept to the search term and/or based on aggregate analyses.

And a decision operation 706, the server checks whether or any context data was received or determined. If context data is available, the server applies context-specific multipliers to the concept scores. The multipliers may be predefined or dynamically determined to indicate a relevance of each concept to each context.

After modifying the concept scores, or if no context data is available, the server determines the most relevant concept, at an operation 710. The server may select a single most relevant concept or may rank the concepts. At an operation 712, the server searches one or more concept specific data sources associated with the most relevant concept. Alternatively, the server may search concept-specific data sources for each of the ranked concepts. To simplify the discussion, this example embodiment chooses the most relevant concept and searches a single corresponding concept-specific data source. The search results comprise a concept-specific cluster.

Figure 8:
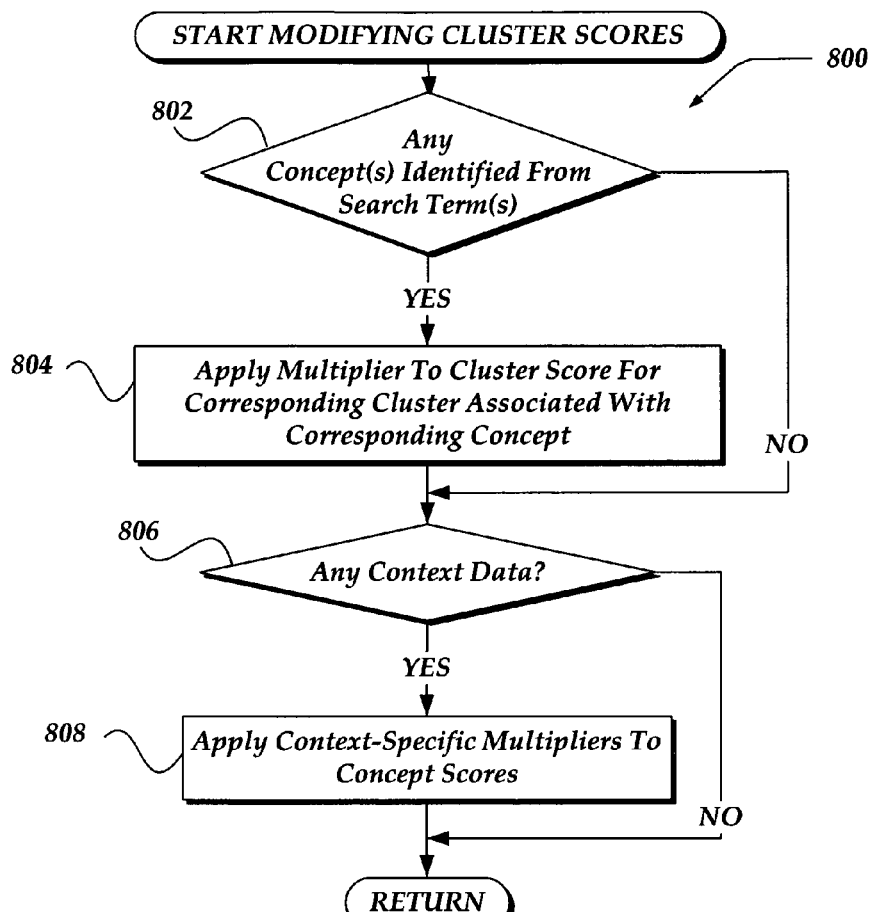
FIG. 8 illustrates a logical flow diagram generally showing one embodiment of a process for modifying cluster scores on clusters of search results.

Further detail is now provided regarding operation 610 of FIG. 6. FIG. 8 illustrates a logical flow diagram generally showing one embodiment of a process 800 for modifying cluster scores. At a decision operation 802, the server checks whether any concepts were identified from the search term. If a concept was identified, the server applies a multiplier, at an operation 804, to the cluster score of a corresponding cluster that is associated with the concept.

After applying a concept multiplier, or if no concepts were identified, the server checks whether or any context data is available, at a decision operation 806. If context data is available, the server applies one or more context-specific multipliers to the concept scores. The modified concept scores are then returned for subsequent ordering of the clusters.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent is:

1. A method for searching data using a network device in communication with a client device, comprising:
   receiving, from the client device, one or more search terms;
   determining at least one concept based on an analysis of the one or more search terms;
   identifying one or more concept-specific data sources over which to perform searches based on the at least one concept;
   performing a search over each of the one or more concept-specific data sources based at least on the search term to generate a plurality of clusters, search results from each concept-specific data source comprising a different cluster in the plurality of clusters;
   determining a relevance score for each result within each cluster based on user specific contextual data for a user of the client device;
   for each cluster in the plurality of clusters, employing at least the relevance scores of each result within the respective cluster to determine a respective cluster score;
   generating an ordered listing of each of the plurality of clusters based on the respective cluster scores; and
   displaying at the client device at least a portion of the ordered plurality of clusters.

2. The method of claim 1, further comprising:
   searching at least one non-concept-specific data source to produce at least one of the plurality of clusters of search results.

3. The method of claim 1, the method further comprising:
   determining user specific contextual data from at least one of the following: a location of the client device used to submit the search term, an application program used by the client device to submit the search term, a data type of a search result currently being displayed by the client device, a web page through which the search term was submitted, a tracked behavior of the user of the client device, and demographic data.

4. The method of claim 1, wherein ordering the plurality of clusters includes creating a document with a cluster display element for each of the plurality of clusters, wherein each cluster display element enables a user to selectably display at least one of the search results of a corresponding one of the plurality of clusters.

5. The method of claim 1, wherein determining a relevance score further comprises employing weighting factors to determine the relevance score that employs a user behavior information.

6. The method of claim 1, wherein the specific contextual data for the user includes at least one of information about an application currently running on the client device, a past behavior of the user, or a past purchase by the user.

7. A network device for searching data, comprising:
memory having data and instructions; and
a processor to execute the data and instructions to perform actions, including:
receiving, from a client device, one or more search terms;
determining at least one concept based on an analysis of the one or more search terms;
identifying one or more concept-specific data sources over which to perform searches based on the at least one concept;
performing a search over each of the one or more concept-specific data sources based at least on the search term to generate a plurality of clusters, search results from each concept-specific data source comprising a different cluster in the plurality of clusters;
determining a relevance score for each result within each cluster based on user specific contextual data for a user of the client device;
for each cluster in the plurality of clusters, employing at least the relevance scores of each result within the respective cluster to determine a respective cluster score;
generating an ordered listing of each of the plurality of clusters based on the respective cluster scores; and
displaying at the client device at least a portion of the ordered plurality of clusters.

8. The network device of claim 7, wherein the one or more search terms further comprises a predefined term that causes the plurality of clusters to be ordered in a predefined order.

9. The network device of claim 7, wherein the processor performs actions, further comprising:
obtaining an advertisement;
including the advertisement into the ordered listing of the plurality of clusters; and
displaying the advertisement at the client device.

10. The network device of claim 9, wherein displaying the advertisement further comprises positioning the advertisement based on a relevance of the advertisement to the plurality of clusters.

11. The network device of claim 7, wherein determining a relevance score further comprises employing weighting factors to determine the relevance score that employs a user behavior information.

12. A computer-readable storage medium that includes data and instructions, wherein the execution of the instructions on a computing device by enabling actions, comprising:
receiving, from a client device, one or more search terms;
determining at least one concept based on an analysis of the one or more search terms;
identifying one or more concept-specific data sources over which to perform searches based on the at least one concept;
performing a search over each of the one or more concept-specific data sources based at least on the search term to generate a plurality of clusters, search results from each concept-specific data source comprising a different cluster in the plurality of clusters;
determining a relevance score for each result within each cluster based on user specific contextual data for a user of the client device;
for each cluster in the plurality of clusters, employing at least the relevance scores of each result within the respective cluster to determine a respective cluster score;
generating an ordered listing of each of the plurality of clusters based on the respective cluster scores; and
displaying at the client device at least a portion of the ordered plurality of clusters.

13. The computer-readable storage medium of claim 12, wherein determining a relevance score further comprises employing weighting factors to determine the relevance score that employs a user behavior information.

14. The computer-readable storage medium of claim 12, wherein the specific contextual data for the user includes at least one of information about an application currently running on the client device, a past behavior of the user, or a past purchase by the user.

15. The computer-readable storage medium of claim 12, wherein at least one cluster is associated with multiple specific data types.

16. The computer-readable storage medium of claim 12, further comprising:
searching at least one non-concept-specific data source to produce at least one of the plurality of clusters of search results.

* * * * *

UNITED STATES PATENT AND TRADEMARK OFFICE
CERTIFICATE OF CORRECTION

PATENT NO. : 7,630,972 B2  Page 1 of 1
APPLICATION NO. : 11/651102
DATED : December 8, 2009
INVENTOR(S) : Edward Stanley Ott, IV et al.

It is certified that error appears in the above-identified patent and that said Letters Patent is hereby corrected as shown below:

On sheet 4 of 8, in figure 4, Reference Numeral 416, line 4, delete "Coffe" and insert -- Coffee --, therefor On sheet 5 of 8, in figure 5, Reference Numeral 514, line 3, delete "Anahiem" and insert -- Anaheim --, therefor.

On sheet 5 of 8, in figure 5, Reference Numeral 500, line 9, delete "Forcast" and insert -- Forecast --, therefor.

In column 3, line 34, delete "(SMGL)," and insert -- (SGML), --, therefor.

In column 8, line 1, delete "(SMGL)," and insert -- (SGML), --, therefor.

Signed and Sealed this

Ninth Day of February, 2010

David J. Kappos
*Director of the United States Patent and Trademark Office*